United States Patent
Fox et al.

(10) Patent No.: US 11,685,838 B2
(45) Date of Patent: Jun. 27, 2023

(54) CLEANING SOLUTION

(71) Applicant: SUN CHEMICAL CORPORATION, Parsippany, NJ (US)

(72) Inventors: Jerome Fox, Algonquin, IL (US); Saeid Savarmand, Bergenfield, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 513 days.

(21) Appl. No.: 16/308,027

(22) PCT Filed: Jun. 13, 2017

(86) PCT No.: PCT/US2017/037147
§ 371 (c)(1),
(2) Date: Dec. 7, 2018

(87) PCT Pub. No.: WO2017/218466
PCT Pub. Date: Dec. 21, 2017

(65) Prior Publication Data
US 2019/0309178 A1    Oct. 10, 2019

Related U.S. Application Data

(60) Provisional application No. 62/349,720, filed on Jun. 14, 2016.

(51) Int. Cl.
| | | |
|---|---|---|
| *C09D 9/00* | (2006.01) | |
| *B08B 1/00* | (2006.01) | |
| *B08B 3/08* | (2006.01) | |
| *B41F 23/00* | (2006.01) | |
| *C11D 7/26* | (2006.01) | |
| *C11D 7/50* | (2006.01) | |
| *C11D 11/00* | (2006.01) | |
| *C11D 7/22* | (2006.01) | |
| *C11D 7/04* | (2006.01) | |
| *C11D 7/24* | (2006.01) | |

(52) U.S. Cl.
CPC .............. *C09D 9/005* (2013.01); *B08B 1/006* (2013.01); *B08B 3/08* (2013.01); *B41F 23/002* (2013.01); *C09D 9/00* (2013.01); *C11D 7/04* (2013.01); *C11D 7/22* (2013.01); *C11D 7/26* (2013.01); *C11D 7/263* (2013.01); *C11D 7/264* (2013.01); *C11D 7/266* (2013.01); *C11D 7/50* (2013.01); *C11D 7/5022* (2013.01); *C11D 11/0041* (2013.01); *C11D 7/248* (2013.01); *C11D 7/261* (2013.01)

(58) Field of Classification Search
None
See application file for complete search history.

(56) References Cited

U.S. PATENT DOCUMENTS

| | | | |
|---|---|---|---|
| 5,443,748 A | 8/1995 | Bergishagen et al. | |
| 5,560,296 A | 10/1996 | Adams | |
| 5,575,859 A | 11/1996 | Madsen et al. | |
| 5,612,303 A * | 3/1997 | Takayanagi | A61K 8/37 510/174 |
| 5,787,811 A | 8/1998 | Achelpohl et al. | |
| 5,958,740 A | 9/1999 | Dees | |
| 6,191,084 B1 | 2/2001 | Christianson | |
| 7,165,494 B2 | 1/2007 | Shields | |
| 8,961,680 B2 | 2/2015 | Pasin et al. | |
| 2006/0260488 A1 | 11/2006 | Westby | |
| 2014/0216502 A1 | 8/2014 | Dudley et al. | |

FOREIGN PATENT DOCUMENTS

| | | |
|---|---|---|
| CA | 2654120 A1 | 8/2009 |
| GB | 1 586 472 A | 3/1981 |
| WO | WO 95/09204 A1 | 4/1995 |
| WO | WO 95/18843 A1 | 7/1995 |
| WO | WO 97/03136 A1 | 1/1997 |
| WO | WO 2017/186230 A1 | 11/2017 |

OTHER PUBLICATIONS

Durkee, J., Use of Hansen solubility parameters to identify cleaning applications for "designer" solvents. A Users Handbook (second edition), CRC Press, Traylor and Francis Group, pp. 203-230. Jun. 15, 2007; pp. 203-204, 206-208.
ASTM International, Standard test methods for evaporation rates of volatile liquids by shell thin-film evaporometer; Designation: D 3539-87 (Reapproved 2004); Jul. 2004; pp. 3, 5.
International Search Report issued in International Application No. PCT/US17/037147, dated Aug. 28, 2017, 2 pages.
Written Opinion of the International Searching Authority issued in International Application No. PCT/US17/037147, dated Aug. 28, 2017, 6 pages.
International Preliminary Report issued in PCT/US2017/037147, dated Dec. 18, 2018, 7 pages.
European Search Report issued in couterpart EP Application No. 17813899.6, dated Jan. 27, 2020, 8 pages.

* cited by examiner

*Primary Examiner* — Eric W Golightly
*Assistant Examiner* — Arlyn I Rivera-Cordero
(74) *Attorney, Agent, or Firm* — Marian E. Fundytus; Ostrolenk Faber LLP.

(57) ABSTRACT

The present invention provides cleaning solutions for removing ink, coating, varnish, adhesive, etc. residue from printing equipment. The cleaning solutions of the present invention comprise one or more solvents, preferably selected from acetoacetates, alcohols, glycol ethers, glycol esters, terpenes, and water, and are preferably free of surfactants. The cleaning solutions of the invention have a relative evaporation time (RET) of less than 60 seconds, and a ratio of the RET to the radius of the sphere of solubility of the resin in the ink to be removed of less than 6.

13 Claims, No Drawings

CLEANING SOLUTION

CROSS REFERENCE TO RELATED APPLICATIONS

The present application is a § 371 National Phase application based on PCT/US2017/037147 filed Jun. 13, 2017, which claims the benefit of U.S. Provisional Application No. 62/349,720, filed Jun. 14, 2016 the subject matter of each of which is incorporated by reference in their entirety.

FIELD OF THE INVENTION

The present invention is related to cleaning solutions used to clean wet or dry ink, coating, varnish, adhesive, etc. residues from printing equipment, such as anilox rollers used in flexographic printing. The cleaning solutions of the present invention are a blend of solvents, and are free of surfactants. The cleaning solutions of the present invention provide superior cleaning performance compared to currently available cleaning solutions.

BACKGROUND

During printing runs, ink residue is left on the anilox rollers, impression cylinders, etc. of the printing presses. The residual ink impairs the print quality of subsequently printed items. Therefore, the ink residue must be periodically removed from the parts of the printing presses to ensure continued quality of printing.

In addition, the color of the printing inks may be changed as appropriate for the print job. When the color of the ink is changed, the previous ink must be cleaned from the parts of the printing press to avoid contamination and impaired print quality of subsequently printed items.

There are a number of cleaning solutions on the market today that can be used for removing all types of flexographic inks (i.e. water-based, solvent-based, and energy curable) from anilox rolls and other press equipment. For example, Alphasonics sells their product Alphaclean 28, and FlexoCleaners markets their cleaning solution Enpurex.

Enpurex is marketed as the best in its class. Enpurex contains ethyl acetoacetate, diacetone alcohol, a nonionic surfactant or blend of nonionic surfactants, anionic surfactant or a blend of anionic surfactants, phenethyl alcohol, and water. Surfactants are present in a high amount. FlexoCleaners describes their Enpurex cleaning solution as containing surfactant with solvents and water that "incorporates smart structures that vibrate 4,000 per second, break up and get underneath the ink."

Surfactants are commonly used in cleaners to promote wetting by reducing the surface tension between two liquids or a liquid and a solid. Surfactants are also used to promote detergency, soil solubilizing, and emulsification properties. Surfactants are also used to couple solvents and water where the solvents either are not or have limited solubility with water.

However, while surfactants are able to promote cleaning, their benefits do not always outweigh the negative effect they can have in the cleaning process. Surfactants may not dissolve some materials, and by being in a cleaner they reduce the amount of solvent present in the cleaner. This reduces the effectiveness of the cleaner in that there is less solvent to promote the dissolving of the material being cleaned.

US 2014/0216502, US 2006/0260488, U.S. Pat. Nos. 5,560,296, and 7,165,494 disclose systems and methods for cleaning ink residue from anilox rollers on printing presses. U.S. Pat. No. 5,560,296 discusses contacting the ceramic coated surface of the printing cylinder with a cleaning composition, but otherwise there is no discussion of the formulation of cleaning solutions. U.S. Pat. No. 5,787,811 discloses a central impression drum flexographic printing press, operating in combination with a cleaning inking system; there is no discussion of cleaning solutions.

U.S. Pat. No. 6,191,084 discloses a composition for cleaning anilox rollers that comprises solvent and a cleansing agent, wherein the cleansing agent comprises an emulsifier, solid grit particles, organic acid, and water, and may contain ammonium chlorides. Similarly, U.S. Pat. No. 5,958,740 discloses a cleaning solution for anilox rollers comprising isopropyl acetate and a crème cleanser, wherein the cleanser comprises n-alkyl dimethylbenzyl ammonium chlorides, n-alkyl dimethylethylbenzyl ammonium chlorides, silica, a dodecyl benzyl sulfonic acid, a nonoxynol emulsifier, and water. Both patents describe cleaning solutions that contain surfactants.

Thus, there remains a need for a cleaning solution that is free of surfactants, and that cleans as well as or better than cleaning solutions that contain surfactants.

SUMMARY OF THE INVENTION

The cleaning solutions of the present invention are particularly suitable for the cleaning of equipment used in the printing or processing of water-based, solvent-based, and energy-curable ink systems, especially flexographic and gravure ink systems. The cleaning solutions of the present invention could also be used for other industrial cleaning applications, including, but not limited to, metal, glass and ceramic surfaces.

In one aspect, the present invention provides a cleaning solution comprising one or more solvents selected from the group consisting of acetoacetates, alcohols, glycol ethers, glycol esters, terpenes, and water; wherein the cleaning solution is free of surfactants; and wherein the cleaning solution removes residual inks and coatings from a surface.

In a particular aspect, the present invention provides a cleaning solution comprising one or more solvents selected from the group consisting of acetoacetates, alcohols, glycol ethers, glycol esters, terpenes, and water; wherein
  a) the cleaning solution is free of surfactants;
  b) the relative evaporation time (RET) of the solvents is less than or equal to 60 seconds;
  c) the ratio of RET of the solvents to the radius of the sphere of solubility of the resin (R) of the ink or coating to be removed is less than or equal to 6; and
wherein the cleaning solution removes residual inks and coatings from a surface.

In another aspect, the present invention provides a method of formulating a cleaning solution comprising:
  a) determining the radius of the sphere of solubility of the resin (R) of the ink or coating from the Hansen solubility parameters of the resin; and
  b) mixing one or more solvents, each independently selected from the group consisting of acetoacetates, alcohols, glycol ethers, glycol esters, terpenes, and water, to produce a solvent blend, wherein:
    i. the RET of the solvent blend is less than or equal to 60 seconds; and
    ii. the ratio of RET to R is less than or equal to 6;
wherein the cleaning solution is free of surfactants; and wherein the cleaning solution removes residual inks and coatings from a surface.

In certain embodiments, the cleaning solutions of the invention are suitable for removing residual inks and coatings from lab, printing, mixing, and application equipment.

In a certain aspect, the present invention provides a method of removing residual inks and coatings from a surface comprising:
a) applying the cleaning solution of the invention on the surface;
b) allowing the cleaning solution to sit on the surface for a period of time sufficient to dissolve the residual ink or coating; and
c) wiping the cleaning solution off of the surface.

Other advantages and aspects of the invention will become apparent from the detailed description below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides a composition and method for cleaning equipment (e.g. anilox roll and/or ink chamber) of a converter's (commercial printer) printing press and equipment, where residual and/or dried ink is detrimental to the printing process.

Advantageously, the present invention offers improved cleaning power and efficiencies with a focus of quickly removing dried printing inks, coatings, and adhesives from surfaces. The surfaces include, but are not limited to, flexographic anilox rolls, and gravure cylinders. The present invention eliminates the need to remove the rollers from the printing presses to carry out off-line cleaning, and decontamination of parts. This represents a faster and more efficient cycle of printing, cleaning, and then quickly returning to the printing cycle.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the term "inks and coatings" includes inks, coatings, paints, varnishes, adhesives, or any other fluids used in printing or coating, and the like, unless specified otherwise.

Throughout this disclosure, all parts and percentages are by weight (wt % or mass % based on the total weight) and all temperatures are in ° C. unless otherwise indicated.

Cleaning Solution

The present invention provides surfactant free cleaning solutions with a solubility parameter suitable for dissolving water-based, solvent-based, and energy-curable inks containing binder resins. The binder resins include, but are not limited to, nitrocellulose (NC) and polyvinylbutyral (PVB). As a result, the effectiveness of the cleaning solutions of the present invention is superior to that of competitive products containing surfactants. The competitive products contain anionic or nonionic surfactants, which are typical in cleaners, including cleaners used on printing inks. However, as described above, use of surfactants in cleaning solutions may compromise the effectiveness of the cleaning solution.

The cleaning solutions of the present invention comprise one or more solvents, and are surfactant free. The present invention is the first time that it has been shown that a cleaning solution without surfactants performs as well as, or better than, prior art cleaning solutions which contain surfactants.

In a particular aspect, the present invention provides a cleaning solution comprising one or more solvents selected from the group consisting of acetoacetates, alcohols, glycol ethers, glycol esters, terpenes, and water; wherein
a) the cleaning solution is free of surfactants;
b) the relative evaporation time (RET) of the solvents is less than or equal to 60 seconds;
c) the ratio of RET of the solvents to the radius of the sphere of solubility of the resin (R) of the ink or coating to be removed is less than or equal to 6; and
wherein the cleaning solution removes residual inks and coatings from a surface.

The cleaning solutions of the present invention will enable printers, especially printers using water-based, solvent-based, and energy-curable based liquid inks, to quickly remove deeply embedded ink from printing press anilox rollers that other cleaners are not able to remove, while maintain consistent color reproduction when changing colors on press. Liquid inks are typically low in viscosity so as to be applied with an anilox roller. The present invention greatly reduces and/or eliminates the need for time-consuming alternatives such as changing rollers between colors, and off-line soda blasting of contaminated rollers.

The polymer or resin of an ink or coating is commonly referred to as the binder, because the polymer or resin holds the formulation together. Examples of polymers that are used as binder resins in flexographic and gravure inks include, but are not limited to, nitrocellulose (NC), polyvinyl butyral (PVB), acrylics, carboxylated acrylics, polyamides, polyketones, ethyl cellulose, cellulose acetate proprionate, polyvinyl acetate, polyvinyl chloride, cellulose esters, copolymers thereof, and the like.

The resin is also responsible for leaving the residues on the surfaces of printing equipment, and requires cleaning. Thus, a cleaning solution is mainly targeting the polymer in the formulation, dissolving it to neutralize its binding effect. Solubility is therefore a key factor when formulating the cleaning solutions of the present invention.

There are two main factors to consider when formulating a cleaning solution of the present invention: i) the degree of solubility capability of the cleaning solution in dissolving and carrying the residues of all types of inks; and ii) the degree of evaporation of the solvents in the cleaning solution to leave a clean and dry surface for the later job. These factors are discussed below.

Solubility is the degree to which two liquids, or a solid and a liquid, can produce a homogenous mixture. The core concept comes from the well-known idea of "like dissolves like," which, in itself, goes back to the even more fundamental concept of "polar-polar" and "nonpolar-nonpolar" interactions in atoms and molecules. The latter further stems down to the cohesion energy between the molecules of materials. The square root of the density of cohesive energy is defined as the total solubility parameter $\delta_{total}$.

$$\delta_{total} = \sqrt{\frac{E_{total}}{V}} \tag{1}$$

where $E_{total}$ is the total cohesive energy per mole or the total energy of vaporization per mole in J/mol and V is the molar volume in (m³/mol) and $\delta_{total}$ is in (MPa)$^{1/2}$. The total cohesive energy (energy of vaporization) of a liquid consists of three parts, which arise from: (atomic) dispersion forces, $E_D$, (molecular) permanent dipole-permanent dipole forces, $E_P$, and (molecular) hydrogen bonding (electron exchange) forces, $E_H$, therefore:

$$E_{total} = E_D + E_D + E_H \tag{2}$$

This leads to the corresponding solubility components as following.

$$E_{total}/V = E_D/V + E_P/V + E_H/V$$

$$\delta_{total}^2 = D^2 + \delta P^2 + \delta H^2 \tag{3}$$

$\delta D$, $\delta P$, and $\delta H$ are the Hansen Solubility Parameters. The three components of solubility, viz., (HSP) Hansen solubility parameters ($\delta D$, $\delta P$, $\delta H$) set up a three dimensional solubility space. Each solvent has its own set of HSP, i.e., ($\delta D$, $\delta P$, $\delta H$) that defines its location in the 3D solubility space. In practice, a blend of solvents is commonly used to provide various capabilities required for the cleaning solution. The solubility parameters of a blend of solvents can be determined from the solubility parameters of the individual component solvents in the blend ($\delta D_i$, $\delta P_i$, $\delta H_i$) knowing the volume fraction of each component solvent $v_i$, where the index "i" refers to each component solvent and can range from i=1 to N, in which N is the total number of solvents in the cleaning solution (solvent blend). Here are the mixing/blending rules for solvent blends:

$$\delta D = \Sigma_i v_i \delta D_i; \delta P = \Sigma_i v_i \delta P_i; \delta H = \Sigma_i v_i \delta H_i$$

$v_i$'s are volume fractions of the $i^{th}$ solvent and
$\Sigma_i v_i = 1.0$ (4)

Polymers have an extra significant solubility number, called "Solubility Radius" or "Radius of Interaction" designated by "R." The radius of interaction of a polymer with HSP ($\delta D_p$, $\delta P_p$, $\delta H_p$) defines a sphere in the solubility space, called the solubility sphere. The radius of the sphere of solubility is calculated as (MPa)$^{1/2}$. If the location of a given solvent/blend in the 3D solubility space falls within the solubility sphere of the polymer, that solvent/blend would be a good dissolving solvent/blend for that polymer. Therefore, the complete set of solubility parameters for a polymer consists of four parameters ($\delta D_p$, $\delta P_p$, $\delta H_p$, R) rather than three for a solvent or solvent blend. To determine if a solvent/blend's solubility location in the 3D solubility space falls inside the solubility sphere of the polymer, the distance of the solvent/blend location and the center of the polymer's center ($D_{(S-P)}$) is determined and compared with the polymer radius of interaction.

$$\text{Distance} = \sqrt{4 \cdot (\delta D - \delta D_p)^2 + (\delta P - \delta P_p)^2 + (\delta H - \delta H_p)^2} \tag{5}$$

$$RED = \frac{\text{Distance}}{R} \tag{6}$$

RED is called "Relative Energy Difference." A smaller RED indicates that the solvent/blend is more likely to dissolve the polymer.

It is known that various solvents have different rates of evaporation, referred to as volatility. Some are more and some are less volatile, and therefore evaporate sooner or later, respectively. In a blend of solvents, the more volatile solvents evaporate sooner. As time goes on, the solvent blend is changing with time. Therefore, it is important to know how the behavior of the retained solvent blend changes with time relative to the polymers in the ink/coating. HSPiP (https://www.hansen-solubility.com/) is a commercially available software that provides such simulation. A representative solution layer of 5 μm thick is selected on a web/substrate moving at a speed of 5 ms/s at 25° C. The initial volume fraction of the solvent components in the solvent blend is fed to the simulator. The simulator provides the Relative Evaporation Time (RET), in seconds, when all of the solvents have evaporated.

To normalize the effect of RET with respect to various polymers, here we define the "Normalized Relative Evaporation Time" as the ratio of RET to the radius of solubility of the polymer, R, calculated using the formula below (NRET). NRET has the units of s/(MPa)$^{1/2}$.

$$NRET = RET/R \tag{5}$$

For a given solvent blend, NRET depends on the polymer that is going to be cleaned, as well as how fast the retained solvent blend dries up.

The present invention shows for the first time that a solvent or solvent blend having a RET of less than or equal to 60 seconds, and an NRET relative to a polymer of less than or equal to 6 is an effective cleaning solution, without the need for including surfactants in the cleaning solution.

The cleaning solutions of the present invention comprise one or more solvents selected from the group consisting of acetoacetates, alcohols, glycol ethers, glycol esters, terpenes, and water. Advantageously, the cleaning solutions of the present invention preferably comprise low levels of surfactants, and most preferably are surfactant free.

When acetoacetates are present in the cleaning solution, the cleaning solutions of the present invention typically contain from about 10 wt % to about 40 wt % of one or more acetoacetates, based on the total weight of the cleaning solution. For example, the cleaning solutions can contain acetoacetates in an amount of 10 wt % to 35 wt %; or 10 wt % to 30 wt %; or 10 wt % to 25 wt %; or 10 wt % to 20 wt %; or 10 wt % to 15 wt %; or 15 wt % to 40 wt %; or 15 wt % to 35 wt %; or 15 wt % to 30 wt %; or 15 wt % to 25 wt %; or 15 wt % to 20 wt %; or 20 wt % to 40 wt %; or 20 wt % to 35 wt %; or 20 wt % to 30 wt %; or 20 wt % to 25 wt %.

When alcohols are present in the cleaning solution, the cleaning solutions of the present invention typically contain from about 10 wt % to about 40 wt % of one or more alcohols, based on the total weight of the cleaning solution. For example, the cleaning solutions can contain alcohols in an amount of 10 wt % to 35 wt %; or 10 wt % to 30 wt %; or 10 wt % to 25 wt %; or 10 wt % to 20 wt %; or 10 wt % to 15 wt %; or 15 wt % to 40 wt %; or 15 wt % to 35 wt %; or 15 wt % to 30 wt %; or 15 wt % to 25 wt %; or 15 wt % to 20 wt %; or 20 wt % to 40 wt %; or 20 wt % to 35 wt %; or 20 wt % to 30 wt %; or 20 wt % to 25 wt %.

When glycol ethers are present in the cleaning solution, the cleaning solutions of the present invention typically contain from about 10 wt % to about 40 wt % of one or more glycol ethers, based on the total weight of the cleaning solution. For example, the cleaning solutions can contain glycol ethers in an amount of 10 wt % to 35 wt %; or 10 wt % to 30 wt %; or 10 wt % to 25 wt %; or 10 wt % to 20 wt %; or 10 wt % to 15 wt %; or 15 wt % to 40 wt %; or 15 wt % to 35 wt %; or 15 wt % to 30 wt %; or 15 wt % to 25 wt %; or 15 wt % to 20 wt %; or 20 wt % to 40 wt %; or 20 wt % to 35 wt %; or 20 wt % to 30 wt %; or 20 wt % to 25 wt %.

When water is present in the cleaning solution, the cleaning solutions of the present invention typically contain from about 10 wt % to about 40 wt % water, based on the total weight of the cleaning solution. For example, the cleaning solutions can contain water in an amount of 10 wt % to 35 wt %; or 10 wt % to 30 wt %; or 10 wt % to 25 wt %; or 10 wt % to 20 wt %; or 10 wt % to 15 wt %; or 15 wt % to 40 wt %; or 15 wt % to 35 wt %; or 15 wt % to 30 wt %; or 15 wt % to 25 wt %; or 15 wt % to 20 wt %; or 20 wt % to 40 wt %; or 20 wt % to 35 wt %; or 20 wt % to 30 wt %; or 20 wt % to 25 wt %.

Suitable acetoacetates include, but are not limited to: acetoacetate, methyl acetoacetate, ethyl acetoacetate, t-butyl acetoacetate, 4-maleyl acetoacetate, 4-fumaryl acetoacetate, 2-(acryloyloxy)ethyl acetoacetate, 2-(methacryloyloxy) ethyl acetoacetate, combinations thereof, and the like.

Suitable alcohols include, but are limited to: diacetone alcohol, phenylethyl alcohol, isopropyl alcohol, 2-butoxyethanol, butyl alcohol, amyl alcohol, cetyl alcohol, benzyl alcohol, combinations thereof, and the like.

Suitable glycol ethers include, but are not limited to: propylene glycol n-butyl ether (glycol ether PnB), ethylene glycol monobutyl ether (glycol ether EB), dipropylene glycol methyl ether (glycol ether DPM), dipropylene glycol n-butyl ether (glycol ether DPnB), ethylene glycol monomethyl ether, ethylene glycol monoethyl ether, ethylene glycol monopropyl ether, ethylene glycol monoisopropyl ether, ethylene glycol monophenyl ether, ethylene glycol monobenzyl ether, diethylene glycol monomethyl ether, diethylene glycol monoethyl ether, diethylene glycol mono-n-butyl ether, ethylene glycol dimethyl ether, ethylene glycol diethyl ether, ethylene glycol dibutyl ether, combinations thereof, and the like.

In one embodiment, the cleaning solutions of the present invention may contain low levels of surfactants, in a range of 0.1 to 15 wt %, based on the total weight of the cleaning solution. Preferably, surfactants are present in an amount of no more than 0.1 to 5 wt %, and more preferably in an amount of no more than 0.1 to 2 wt %. Most preferably, the cleaning solutions of the present invention contain no surfactants, and are surfactant free. Suitable surfactants are well known in the art and include, but are not limited to non-ionic or anionic surfactants, which are preferably water soluble. For example, suitable non-ionic surfactants include, but are not limited to: alcohol ethoxylates, nonylphenol ethoxylates (NPE), alkylphenol ethoxylates (APE), octylphenol ethoxylates (OPE), cocamide DEA, combinations thereof, and the like. Suitable anionic surfactants include, but are not limited to: sodium lauryl sulfate, sodium xylene sulfonate, sodium gluconate, sodium lauryl sarcosinate, magnesium lauryl sulfate, combinations thereof, and the like.

Testing of the cleaning solutions of the invention and associated methods of use have shown superior cleaning properties when compared to currently available cleaning products in the field. This includes further removal of ink from flexographic anilox rollers after other cleaners and cleaning methods have already been used. One of the advantages of this improved cleaning power of flexographic anilox rollers and gravure cylinders results in an increase in cell volume that is not seen with competitive products. One of ordinary skill in the art would readily know that restoring proper cell volume (measured by BCM (billion cubic microns) or CBM) to anilox rollers during cleanup is an important factor in providing good print quality as clogged and partially clogged cells are known to be a major cause of compromised print quality.

The cleaning solutions of the invention could be supplied in any container that is suitable for applying to, for example, sponges or cloths, or directly to equipment.

EXAMPLES

The following examples illustrate specific aspects of the present invention, and are not intended to limit the scope thereof in any respect and should not be so construed.

Assess Cleaning Ability of Multiple Cleaning Solutions

To assess cleaning ability, an ink was applied to an anilox plate with a K-printing Proofer. The inked plate was placed into an oven at 120° F. (48.889° C.) for one hour, and then allowed to sit at room temperature for at least 24 hours. The cleaning solutions were applied using a pipette in straight lines the length of the plate, in separate areas where the ink was present, taking care that the cleaning solutions did not come into contact with each other. The cleaning solutions were allowed to remain undisturbed for periods of time equaling 30 seconds, 1 minute, 2 minutes, and 3 minutes. At the end of each period of time, the cleaning solutions were absorbed off of the plate by 1) placing separate absorbent paper towel strips onto all cleaning solutions; then 2) applying pressure to the paper towels by using a 10 kg roller and rolling over each paper towel twice. The paper towel strips were removed immediately after rolling. The efficiency of cleaning was assessed using a gray scale as described below.

Additional studies assessing the cleaning ability of Examples 1, 2, and 3 compared to commercially available cleaning solutions, Enpurex and SunVisto® Anilox Renew, were also conducted. The cleaning solutions were applied to separate areas of the plate where the ink was present, and allowed to remain undisturbed for 3 minutes. After 3 minutes, the cleaning solutions were absorbed off of the plate by 1) placing absorbent paper towel strips onto all three cleaning solutions; then 2) applying pressure to the paper towels by using a 10 kg roller and rolling over each paper towel twice. A visual comparison of the amount of ink remaining on the plate and on the towel was made and recorded. Each cleaner was then applied directly to a paper towel and used to wipe the respective area of the plate with one wipe (very little pressure) to remove residue above the anilox cells. The cleaners were then applied 1) a second time in a small area of the plate; and 2) to the opposite side of the plate to see if the cleaners were able to remove remaining ink from the plate and from the cells. That is, for the second application of cleaners, Example 1, 2, or 3 was applied to the area previously cleaned by either Enpurex or SunVisto® Anilox Renew, and vice versa. The cleaners were again allowed to sit for 3 minutes, then removed with the same paper towel and roller method as described. A visual comparison of the amount of ink remaining on the plate and on the towel was made and recorded. The results of the second application indicated whether any of the cleaners was able to remove residue that had not been removed by the previously applied cleaner.

Rating Efficiency of Cleaning

The efficiency of cleaning was rated according to a gray scale per ASTM D2616-12 Standard Test Method for Evaluation of Visual Color Difference with a Gray Scale. The level of cleaning of the anilox plate was rated according to the amount of ink removed by each cleaning solution. Level of cleaning was rated as amount of ink removed from the anilox plate, on a scale of 1 to 5, with 5 being the worst (i.e. no ink removed, and no cleaning). The rating scale is shown in Table 1.

TABLE 1

Rating of ink removal

| Rating | Amount of ink removed (%) |
| --- | --- |
| 5 | 0 |
| 4.5 | 12.5 |
| 4 | 25 |
| 3.5 | 37.5 |
| 3 | 50 |
| 2.5 | 62.5 |
| 2 | 75 |
| 1.5 | 87.5 |
| 1 | 100 |

A cleaning rating of less than or equal to 2.5 is considered a pass.

Hansen Solubility Parameters

The Hansen solubility parameters of some solvents are shown in Table 2.

TABLE 2

Hansen solubility parameters of solvents

| Solvent | Hansen solubility (MPa)$^{1/2}$ | | |
| --- | --- | --- | --- |
| | $\delta D$ dispersion | $\delta P$ polar | $\delta H$ H-bonding |
| Ethyl acetoacetate (EAA) | 16.5 | 7.3 | 8.3 |
| Diacetone alcohol (DA) | 15.8 | 8.2 | 10.8 |
| Propylene glycol n-butyl ether (glycol ether PnB) | 14.9 | 4.9 | 10.7 |
| Ethylene glycol monobutyl ether (glycol ether EB) | 16.0 | 5.1 | 12.3 |
| Dipropylene glycol methyl ether (glycol ether DPM) | 15.5 | 5.7 | 11.2 |
| Dipropylene glycol n-butyl ether (glycol ether DPnB) | 15.7 | 6.5 | 10.0 |
| Water | 15.6 | 16.0 | 42.3 |

The value of each Hansen solubility parameter of a cleaning solution was calculated by multiplying the value of the parameter of the solvent by the amount of solvent in the cleaning solution, and adding the calculated values of each solvent. Thus, for Example 1 below, the dispersion Hansen solubility parameter was calculated as follows:

$$\delta D = \Sigma v_i \delta D_i = 0.30 \times 16.5 (EAA) = 4.95$$

$$0.20 \times 15.8 (DA) = 3.16$$

$$0.30 \times 14.9 \text{ (glycol ether PnB)} = 4.47$$

$$0.20 \times 15.6 \text{ (water)} = 3.12$$

$$\text{Sum} = 15.7$$

Capatch Test

The Capatch test was used to measure the efficiency of cleaning as indicated by the amount of residual ink removed from inside the cells of an anilox roller. The better the removal of residual ink from the cells, the more cell volume is recovered (i.e. closer to the original cell volume). More cell volume recovered improves print quality.

Capatch is a use-one-time tool that works by contact with the roll as a kind of sticker. A calibrated amount of indicator fluid contained within a capsule on the sticker is forced across the roll under the Capatch sticker when the user runs across the surface with a blade, known as the doctor blade. The blob of indicator fluid breaks through the front of the capsule and is pushed into the open cells of the roll by the doctor blade. The liquid blob first fills the cells nearest the capsule, decreasing in volume as it is pushed forward, until the entire volume of the blob has vanished into the roll cells. The length of the liquid track determines the current volume of the open cells of the roll. Since the volume of the indicator fluid is constant in all Capatch strips, the length of the track is inversely proportional to the ink, adhesive or coating volume of the roll cells. For further details, visit http://capatch.com/index_en.htm.

Example 1. Formulation and Testing of Cleaning Solution

The Example 1 cleaning solution was prepared according to the formulation in Table 3. The materials were mixed until homogenous.

TABLE 3

Formulation of Example 1

| Solvent | % | Hansen solubility (MPa)$^{1/2}$ | | |
| --- | --- | --- | --- | --- |
| | | $\delta D$ dispersion | $\delta P$ polar | $\delta H$ H-bonding |
| EAA | 30.00 | 16.5 | 7.3 | 8.3 |
| DA | 20.00 | 15.8 | 8.2 | 10.8 |
| Glycol ether PnB | 30.00 | 14.9 | 4.9 | 10.7 |
| Water | 20.00 | 15.6 | 16.0 | 42.3 |
| Total | 100.00 | | | |
| Hansen solubility of blend | | 15.7 | 8.5 | 16.3 |

The flash point of cleaning solution Example 1 was measured as greater than 61° C. This is advantageous because a flash point greater than 61° C. would be considered combustible, rather than flammable, and allow for less stringent storage requirements.

The calculated Hansen solubility parameters of Example 1 are shown in Table 3. A range of 14.5 to 16.5 dispersion, 7 to 10 polar, and 13 to 20 hydrogen bonding has been demonstrated through testing to have superior ink solvency, cleaning power and removal efficiency for removing wet and dried-in ink debris and stains from chrome- and ceramicplated anilox rolls and gravure cylinders, compared with known state-of-the-art products in the market (e.g. Enpurex from FlexoCleaners).

Superior solvency for typical solvent-based, water-based, and energy-curable flexographic inks was shown by soaking anilox rollers with dried ink debris in the cleaning solution, and measuring the resulting increase in color stain density of the solution after soaking compared with other products. Superior cleaning efficiency was demonstrated visually on the rollers, cleaning media, and by increased measured roller engraving cell volume.

Test trials comparing the Example 1 cleaning solution with Enpurex and SunVisto® Anilox Renew were conducted. These are described below.

Trial 1:

Testing was performed on an anilox roll from a Cararro flexographic printing press on which a water-based cyan flexographic ink containing a crosslinker had been printed and subsequently cleaned with Enpurex. Example 1 cleaning solution removed ink from the roll, despite the fact that it had been previously cleaned. As a control, SunVisto® Anilox Renew (a commercially available cleaning solution from Sun Chemical) was used, but did not remove any more ink from the anilox roller. Next, an anilox roll that had been used to print a water based cyan ink was first thoroughly cleaned using Enpurex and then subsequently cleaned using the Example 1 cleaning solution. Cleaning was done by gently scrubbing with a foam pad soaked with cleaning solution. When cleaning with the Example 1 cleaning solution, the color of the foam pad was green. It so happened that yellow was run on the roller a few weeks back. The Example 1 cleaning solution removed not only further cyan from the engraving cell, but also the leftover yellow, forming a green color on the pad, that Enpurex failed to remove.

Trial 2:

A test was performed on an anilox roll that had been used to print solvent-based inks and then cleaned using Enpurex. The belief was that Enpurex had cleaned the anilox cells on this roller such that they did not contain any residual ink. After cleaning with Enpurex, the cleaning process was repeated on the same anilox roll using the Example 1 cleaning solution. After cleaning with Example 1 cleaning solution, the cleaning rag was black with ink, proving that the cells were not completely cleaned using Enpurex, and that Example 1 cleaning solution was able to remove ink that was not removed by Enpurex. In a further test, an anilox roller was first thoroughly cleaned using the Example 1 cleaning solution and then subsequently with Enpurex, which did not remove any further ink residue, indicating that the Example 1 cleaning solution had removed all of the ink residue.

Trial 3:

A test was performed on a roller that had been used to print solvent-based inks and then was thoroughly cleaned with Enpurex. As with Trial 2, the belief was that Enpurex had cleaned the anilox cells on this roller such that they did not contain any residual ink. After cleaning with Enpurex, the cleaning process was repeated on the same anilox using the Example 1 cleaning solution. The roller was subjected to a Capatch test (see test method above) both after cleaning with Enpurex and after subsequent cleaning with Example 1. The result was that ½ BCM was gained after cleaning with Example 1. ½ BCM is a significant improvement that would be expected to provide improved printability. In a further test, an anilox roller was first thoroughly cleaned using the Example 1 cleaning solution and then subsequently with Enpurex, which did not exhibit any further BCM gain than when the anilox roller was cleaned by Example 1 alone, indicating that the Example 1 cleaning solution had removed all of the ink residue.

Trial 4:

Lab testing of cleaning UV-curable inks was conducted. A series of lab tests were performed by making drawdowns of UV-curable flexographic and gravure inks on glass and then curing the ink films. The cured inks were then cleaned from the glass using the Example 1 cleaning solution. The results indicated that the Example 1 cleaning solution is very effective for cleaning UV-curable inks.

Example 2. Cleaning Solution Example 2

The formulation of Example 2 cleaning solution is shown in Table 4 below. Example 2 cleaning solution was prepared by mixing the solvents until homogenous.

TABLE 4

Formulation of Example 2

| | | Hansen solubility (MPa)$^{1/2}$ | | |
|---|---|---|---|---|
| Solvent | % | δD dispersion | δP polar | δH H-bonding |
| EAA | 25.00 | 16.5 | 7.3 | 8.3 |
| DA | 25.00 | 15.8 | 8.2 | 10.8 |
| Glycol ether PnB | 25.00 | 14.9 | 4.9 | 10.7 |
| Water | 25.00 | 15.6 | 16.0 | 42.3 |
| Total | 100.00 | | | |
| Hansen solubility of blend | | 15.7 | 9.1 | 18.0 |

Example 2 cleaning solution was also compared to Enpurex and showed similar results to Example 1, i.e. Example 2 removed residual ink from anilox rolls and press equipment nearly identically to Example 1, and showed improvement vs. Enpurex. In one test, Example 2 cleaning solution removed additional ink residue from anilox rolls that were initially cleaned with Enpurex.

Example 3. Cleaning Solution Example 3

The formulation of Example 3 cleaning solution is shown in Table 5 below. Example 3 cleaning solution was prepared by mixing the solvents until homogenous.

TABLE 5

Formulation of Example 3

| | | Hansen solubility (MPa)$^{1/2}$ | | |
|---|---|---|---|---|
| Solvent | % | δD dispersion | δP polar | δH H-bonding |
| EAA | 35.00 | 16.5 | 7.3 | 8.3 |
| DA | 15.00 | 15.8 | 8.2 | 10.8 |
| Glycol ether PnB | 35.00 | 14.9 | 4.9 | 10.7 |
| Water | 15.00 | 15.6 | 16.0 | 42.3 |
| Total | 100.00 | | | |
| Hansen solubility of blend | | 15.7 | 7.9 | 14.6 |

Example 3 cleaning solution was also compared to Enpurex and showed similar results to Example 1, i.e. Example 3 removed residual ink from anilox rolls and press equipment nearly identically to Example 1, and showed improvement vs. Enpurex. In one test, Example 3 cleaning solution removed additional ink residue from anilox rolls that were initially cleaned with Enpurex.

Examples 4 to 6. Cleaning Solutions Examples 4 to 6

The formulations of Examples 4 to 6 cleaning solutions are shown in Table 6 below. Each of the cleaning solutions was prepared by mixing the solvents until homogenous.

TABLE 6

Formulations of Examples 4 to 6

| Solvent | Ex. 4 | Ex. 5 | Ex. 6 |
|---|---|---|---|
| EAA | 30.00 | 30.00 | 30.00 |
| DA | 20.00 | 20.00 | 20.00 |
| Glycol ether PnB | | | |
| Glycol ether EB | 30.00 | | |
| Glycol ether DPM | | 30.00 | |
| Glycol ether DPnB | | | 30.00 |
| Water | 20.00 | 20.00 | 20.00 |
| Total | 100.00 | 100.00 | 100.00 |

Example 7. Ability of Cleaning Solutions to Remove a Cyan Nitrocellulose (NC) Ink Related to RET and NRET A cyan nitrocellulose (NC) ink (HI34500297 DPU-312 Process Cyan NC Ink from Sun Chemical) was applied to anilox plates as described above. The radius of the sphere of solubility of the NC in the ink is 11.5 $(MPa)^{1/2}$. The cleaning ability of Examples 1 to 6, and two commercially available cleaning solutions (Enpurex from FlexoCleaners; and CeramClean Solv-it from Harper Scientific Division) was tested as described above. The RET and NRET for each cleaning solution was calculated. The commercially available cleaning solutions contain surfactants. Table 7 shows the results of the testing. As noted above, a cleaning rating of less than or equal to 2.5 is considered a pass.

TABLE 7

Ability to remove cyan NC ink

| Cleaner | Cleaning Rank at 3 min. | RET (sec.) | NRET (RET/R) |
|---|---|---|---|
| Ex. 1 | 2.5 (pass) | 39 | 3.4 |
| Ex. 2 | 2.5 (pass) | 35 | 3.0 |
| Ex. 3 | 2.5 (pass) | 44 | 3.8 |
| Ex. 4 | 2.5 (pass) | 54 | 4.7 |
| Ex. 5 | 2.5 (pass) | 49 | 4.3 |
| Ex. 6 | 3 (fail) | 113 | 9.8 |
| Enpurex | 3.5 (fail) | 56 | 4.9 |
| CeramClean Solv-it | 3 (fail) | 32 | 2.8 |

The results in Table 7 show surfactant free cleaning solutions having a RET of less than 60 seconds and NRET of less than 6 efficiently remove a cyan NC ink (Examples 1, 2, 3, 4, and 5). A surfactant free cleaning solution (Ex. 6) having a RET of greater than 60 seconds, and an NRET of greater than 6 fails to clean a cyan NC ink. In addition, commercially available cleaning solutions containing surfactants also fail to clean a cyan NC ink, despite having a RET of less than 60 seconds and NRET of less than 6. Thus, it has been shown that the surfactant free cleaning solutions of the present invention are superior to commercially available surfactant-containing cleaning solutions.

Example 8. Ability of Cleaning Solutions to Remove a Cyan Polyvinyl Butyral (PVB) Ink Related to RET and NRET A cyan polyvinyl butyral (PVB) ink (EPFS5796783 Nulam Hi Str Cyan PVB Ink from Sun Chemical) was applied to anilox plates as described above. The radius of the sphere of solubility of the PVB in the ink is 8 $(MPa)^{1/2}$. The cleaning ability of Examples 1 to 6, and two commercially available cleaning solutions (Enpurex from FlexoCleaners; and CeramClean Solv-it from Harper Scientific Division) was tested as described above. The RET and NRET for each cleaning solution was calculated. The commercially available cleaning solutions contain surfactants. Table 8 shows the results of the testing. As noted above, a cleaning rating of less than or equal to 2.5 is considered a pass.

TABLE 8

Ability to remove cyan PVB ink

| Cleaner | Cleaning Rank at 3 min. | RET (sec.) | NRET (RET/R) |
|---|---|---|---|
| Ex. 1 | 2.5 (pass) | 39 | 4.9 |
| Ex. 2 | 2.5 (pass) | 35 | 4.4 |
| Ex. 3 | 2.5 (pass) | 44 | 5.5 |
| Ex. 4 | 3 (fail) | 54 | 6.8 |
| Ex. 5 | 4 (fail) | 49 | 6.1 |
| Ex. 6 | 2.5 (pass) | 113 | 14.1 |
| Enpurex | 3 (fail) | 56 | 7.0 |
| Harper Solv-it | 3 (fail) | 32 | 4.0 |

The results in Table 8 show that surfactant free cleaning solutions having an RET of less than 60 seconds and NRET of less than 6 (Examples 1, 2, and 3) remove cyan PVB ink efficiently. Examples 4 and 5, each having NRET above 6, fail to remove cyan PVB ink. Commercially available surfactant-containing cleaning solutions fail to remove cyan PVB inks. Example 6, despite having a RET greater than 60 seconds and NRET greater than 6, efficiently removes cyan PVB ink. It is hypothesized that this is due to the fact that the Example 6 blend is closer to the center of the solubility sphere of PVB ($D_{(S-P)}$=10.17) than either Examples 4 or 5 ($D_{(S-P)}$=14.94 and 12.54 respectively) (the Hansen solubility parameters of PVB are $\delta D$=18.6, $\delta P$=4.4 and $\delta H$=13.0).

Thus, the examples of the present invention show for the first time that surfactant free cleaning solutions having a RET of less than 60 seconds and NRET of less than 6 provide superior cleaning ability for removing ink residue from anilox plates and other printing equipment. The cleaning solutions of the present invention have superior cleaning ability compared to commercially available cleaning solutions containing surfactants.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:
1. A method of removing residual inks and coatings from a surface comprising:
 a) applying a cleaning solution on the surface, wherein the cleaning solution comprises one or more solvents selected from the group consisting of acetoacetates, alcohols, glycol ethers, glycol esters, terpenes, and water; wherein
   i. the cleaning solution is free of surfactants;

ii. the relative evaporation time (RET) of the solvents is less than or equal to 60 seconds;
iii. a ratio of RET of the solvents to a radius of the sphere of solubility of a resin (R) of an ink or coating to be removed is less than or equal to 6; and
wherein the cleaning solution comprises at least one acetoacetate; and
wherein the cleaning solution removes residual inks and coatings from a surface;
b) allowing the cleaning solution to sit on the surface for a period of time to dissolve equal to or greater than 62.5% of the residual ink or coating; and
c) wiping the cleaning solution off of the surface.

2. A cleaning solution comprising one or more solvents selected from the group consisting of acetoacetates, alcohols, glycol ethers, glycol esters, terpenes, and water; wherein
a) the cleaning solution is free of surfactants;
b) the relative evaporation time (RET) of the solvents is less than or equal to 60 seconds;
c) a ratio of RET of the solvents to a radius of the sphere of solubility of a resin (R) of an ink or coating to be removed is less than or equal to 6; and
wherein the cleaning solution comprises at least one acetoacetate; and wherein the cleaning solution removes residual inks and coatings from a surface.

3. The cleaning solution of claim 2, wherein the one or more acetoacetates are present in an amount of 10 wt % to 40 wt %, based on the total weight of the cleaning solution.

4. The cleaning solution of claim 2, wherein the one or more alcohols are present in an amount of 10 wt % to 40 wt %, based on the total weight of the cleaning solution.

5. The cleaning solution of claim 2, wherein the one or more glycol ethers are present in an amount of 10 wt % to 40 wt %, based on the total weight of the cleaning solution.

6. The cleaning solution of claim 2, wherein the water is present in an amount of 10 wt % to 40 wt %, based on the total weight of the cleaning solution.

7. The cleaning solution of claim 2, wherein at least one of the acetoacetates is ethyl acetoacetate.

8. The cleaning solution of claim 2, wherein at least one of the alcohols is diacetone alcohol.

9. The cleaning solution of claim 2, wherein the glycol ethers are independently selected from the group consisting of propylene glycol n-butyl ether (glycol ether PnB), ethylene glycol monobutyl ether (glycol ether EB), and dipropylene glycol methyl ether (glycol ether DPM).

10. The cleaning solution of claim 2, wherein at least one glycol ether is glycol ether PnB.

11. The cleaning solution of claim 2, which removes equal to or greater than 62.5% of the residual ink or coating from the surface.

12. The cleaning solution of claim 2, which is suitable for removing residual inks and coatings from lab, printing, mixing, and application equipment.

13. A method of formulating a cleaning solution comprising:
a) determining a radius of the sphere of solubility of a resin (R) of an ink or coating from the Hansen solubility parameters of the resin; and
b) mixing one or more solvents, each independently selected from the group consisting of acetoacetates, alcohols, glycol ethers, glycol esters, terpenes, and water, to produce a solvent blend, wherein:
i. a relative evaporation time (RET) of the solvent blend is less than or equal to 60 seconds; and
ii. a ratio of RET to R is less than or equal to 6; ;
wherein the cleaning solution comprises at least one acetotate;
wherein the cleaning solution is free of surfactants; and
wherein the cleaning solution removes residual inks and coatings from a surface.

* * * * *